United States Patent [19]
Salecker et al.

[11] Patent Number: 5,964,680
[45] Date of Patent: Oct. 12, 1999

[54] POWER TRAIN FOR A MOTOR VEHICLE

[75] Inventors: Michael Salecker; Klaus Küpper; Thomas Jäger, all of Bühl; Franz Kosik, Ostfildern; Thomas Grass, Urbach, all of Germany

[73] Assignees: Luk Getriebe-Systeme GmbH, Buhl/Baden; Daimler-Benz Aktiengesellschaft, Stuttgart, both of Germany

[21] Appl. No.: 09/066,230

[22] Filed: Apr. 24, 1998

[30] Foreign Application Priority Data

Apr. 26, 1997 [DE] Germany ............................ 197 17 699

[51] Int. Cl.⁶ ............................ B60K 41/28; B60K 41/02
[52] U.S. Cl. ...................... 477/74; 192/3.61; 192/13 R; 477/171; 477/906
[58] Field of Search ................................ 192/3.61, 13 R; 477/171, 906, 74, 96, 99, 167, 173, 181; 701/63

[56] References Cited

U.S. PATENT DOCUMENTS

| | | |
|---|---|---|
| 4,833,613 | 5/1989 | Mack et al. ........................ 477/906 X |
| 5,016,174 | 5/1991 | Ito et al. ........................... 477/906 X |
| 5,169,365 | 12/1992 | Friedmann . |
| 5,217,412 | 6/1993 | Indlekofer et al. . |
| 5,305,215 | 4/1994 | Brekkestran et al. .............. 477/110 X |
| 5,377,796 | 1/1995 | Friedmann et al. . |
| 5,409,091 | 4/1995 | Reik et al. . |
| 5,450,934 | 9/1995 | Maucher . |
| 5,632,706 | 5/1997 | Kremmling et al. ................. 477/74 X |
| 5,679,091 | 10/1997 | Salecker et al. . |
| 5,855,532 | 1/1999 | Sugiyama ............................ 477/906 X |

*Primary Examiner*—Rodney H. Bonck
*Attorney, Agent, or Firm*—Darby & Darby

[57] ABSTRACT

An automated clutch between the engine and the variable-speed transmission in the power train of a motor vehicle is operated by a control unit which receives signals from several circuits and/or sensors via one or more conductors. The control unit shifts from a normal operating mode to an emergency mode when one or more sensors and/or circuits and/or conductors are defective. When in emergency mode, the control unit disengages the clutch when the driver starts the engine while the vehicle brake or the parking brake is applied. This ensures that the engine can drive the vehicle as soon as the transmission is shifted into a forward gear or into reverse gear and the application of the brake or brakes is terminated because the control unit is then again free to engage the clutch. Furthermore, such mode of operation enables the driver to shift the transmission into or from a selected gear in response to the application of a relatively small force to the gear shifting lever.

28 Claims, 2 Drawing Sheets

Fig. 1

Fig. 2

POWER TRAIN FOR A MOTOR VEHICLE

BACKGROUND OF THE INVENTION

The invention relates to motor vehicles in general, and more particularly to improvements in power trains for use in passeger cars, vans, trucks and/or other types of motor vehicles. Still more particularly, the invention relates to improvements in power trains of the type wherein an automated engageable and disengageable torque transmission system (such as a friction clutch, a lockup clutch, a magnetic powder clutch or the like) cooperates with a prime mover (such as an internal combustion engine) and/or with a variable-speed transmission (e.g., a manually shiftable or an automated transmission) to transmit torque, e.g., from a rotary output element (such as a camshaft or a crankshaft) of the prime mover to a rotary input element (e.g., a shaft) of the transmission.

A power train which embodies an automated torque transmission system (hereinafter called clutch for short) further comprises means for operating the automated clutch, and such operating means can comprise an electronic signal receiving, processing and transmitting control unit, at least one actuator which is responsive to signals from the control unit and can adjust the clutch to select the rate of torque-transmission, and means (such as one or more sensors, electronic and/or other circuits, and one or more conductors) for transmitting signals to the input or inputs of the control unit. Furthermore, the power train comprises means for starting or operating the prime mover (e.g., an electronic circuit which is connected with the control unit by a bus and/or other suitable signal conducting means). It is also known to cause the control unit to shift from a standard or normal mode of operation to an emergency or standby mode when one or more constituents of the signal transmitting means become inoperative or defective, either entirely or in part. For example, the condition of the control unit can be changed from the standard mode to the emergency mode in response to a breakdown of a sensor, a circuit and/or a conductor forming part of the signal transmitting means.

A control unit having standard and emergency or standby modes can be utilized in power trains which embody automated clutches and/or automated transmissions and serve to transmit motion from the prime mover (e.g., an internal combustion engine or a motor) to the driven wheels of the motor vehicle. In accordance with a presently known proposal, the control unit is set up to automatically engage the clutch if the prime mover of the motor vehicle is arrested while the transmission is in (a forward or reverse) gear. This causes the clutch to act as a parking brake when the engine is turned off while the transmission is in a gear other than neutral. Thus, the drag torque of the engine prevents the vehicle from carying out an undesired rolling movement when the engine is off, irrespective of the condition of the vehicle brake or brakes.

However, the just described conventional power trains also exhibit certain serious drawbacks. For example, if the motor vehicle is brought to a halt on a sloping surface, i.e, if the clutch is automatically engaged when the engine is off but the transmission is in a forward or rearward gear while the wheels contact an upwardly or downwardly sloping road surface, the power train is stressed so that a shifting of the transmission from a forward or reverse gear necessitates the exertion of a substantial effort or cannot be carried out at all.

Reference may be had, for example, to published German patent applications Nos. 195 04 847 and 195 48 799 which disclose that the control unit receives signals from sensors which monitor the condition of the transmission (i.e., the selected gear ratio) and/or serve to transmit signals denoting the intention by the operator of the motor vehicle to shift from a previously selected gear into a different gear. An advantage of the signals denoting the intent of an operator or driver to shift the transmission into a particular gear (e.g., as a result of the application of a certain force to a gear shifting lever or the like) is that the clutch can be intentionally disengaged in good time, for example, prior to actual shifting of the transmission into a different gear. Thus, in normal operation, the engine can be activated or actually started while the transmission is in neutral gear. However, if, in normal operation of the power train, the engine can be started only while the transmission is in neutral gear, the transmission cannot be shifted into neutral gear (from the reverse gear or from a forward gear) when the sensor or sensors which monitor the condition of the transmission and/or the operator's intent to shift the transmission into a selected gear is or are defective and/or the connection(s) between such sensor or sensors and the control unit for the clutch is or are defective. The reason is that, in the event of such defectiveness, the clutch is not automatically disengaged and, therefore, the engine of the motor vehicle cannot be activated or started for the purpose of setting the motor vehicle in motion, for example, for the purpose of causing the vehicle to perform a crawling movement. In other words, the motor vehicle is no longer capable of moving, and this solely as a result or consequence of a defectiveness or malfunctioning of one or more sensors and/or circuits and/or connection or connections between such defective or malfunctioning sensor or sensors and/or circuit or circuits on the one hand, and the circuitry of the control unit for the automated clutch on the other hand.

OBJECTS OF THE INVENTION

An object of the invention is to provide a power train which overcomes the above outlined drawbacks of conventional power trains with automated torque transmission systems and/or automated transmissions in a simple, space-saving, highly reliable and relatively inexpensive manner.

Another object of the invention is to provide a power train wherein a temporary or continuous defectiveness of one or more constituents of the means for transmitting signals to the control unit of the means for operating an automated clutch does not prevent the operator of the motor vehicle from starting or actuating the prime mover (such as an internal combustion engine or a motor) of the improved power train.

A further object of the invention is to provide a power train wherein the failure of one or more sensors to detect the condition of a manually shiftable or automated transmission does not prevent the operator of the motor vehicle from setting the vehicle in motion.

An additional object of the invention is to provide a power train which permits at least a limited utilization of the motor vehicle under adverse circumstances (such as the failure of the means for transmitting signals to the control unit for an automated clutch) which entail a total uselessness of motor vehicles embodying conventional power trains.

Still another object of the invention is to provide a novel and improved control unit for use in the power train of a motor vehicle to regulate or control the operation of an automated friction clutch, lockup clutch, magnetic powder clutch, disc clutch, safety clutch or an analogous torque transmitting system.

A further object of the invention is to provide a novel and improved method of operating a power train which can be utilized in a motor vehicle and embodies means for regulating or controlling the operation of an automated part or two or more automated parts of the power train.

Another object of the invention is to provide a novel and improved combination of an engine, an automated clutch, one or more vehicle brakes, and clutch operating means for use in the power train of a motor vehicle.

A further object of the invention is to provide a power train wherein the engine and/or the transmission does not unduly influence the magnitude of the forces which are necessary to shift the transmission into or from a selected gear.

An additional object of the invention is to provide a motor vehicle which embodies the above outlined power train.

Still another object of the invention is to provide a novel and improved combination of parts which can be utilized to influence the condition of a prime mover (such as an internal combustion engine or a motor) in the power train of a motor vehicle, such as a passenger car, a van, a truck or the like.

A further object of the invention is to provide a power train which exhibits the above outlined features and advantages and can be put to use in existing motor vehicles as a superior substitute for heretofore known and utilized power trains.

SUMMARY OF THE INVENTION

One feature of the present invention resides in the provision of a power train which can be utilized in a motor vehicle and comprises a prime mover (such as an internal combustion engine or a motor), starting means which is actuatable or operable to actuate and to actually start the prime mover, a variable-speed transmission, an engageable and disengageable automated torque transmission system, at least one brake which is operable to oppose a movement of the motor vehicle, and means for operating the torque transmission system to select the magnitude of the torque being transmissible by such system. The operating means comprises a signal receiving, processing and transmitting control unit, means for transmitting signals to the control unit (such signal transmitting means has operative and inoperative conditions), and actuator means (e.g., an electric motor and motion transmitting means controlled by the electric motor) arranged to operate the torque transmission system in response to signals from the control unit. The control unit is effective to operate in a standard or normal mode in the operative condition and in an emergency or standby mode in the inoperative condition of the signal transmitting means. Furthermore, the control unit is operative to disengage the torque transmission system by way of the actuator means when the starting means is actuated simultaneously with the operation (i.e., application) of the at least one brake while the control unit operates in the emergency mode (because the signal transmitting means is inoperative, either entirely or in part).

The means for transmitting signals to the control unit can include one or more sensors and/or one or more conductors and/or one or more electric or electronic circuits.

The torque transmission means can comprise a clutch, and such clutch can (but need not always) be arranged to receive torque from the prime mover and to transmit torque to the transmission.

The means for starting the prime mover can comprise a circuit and/or a component which is operable by the control unit. For example, such component can comprise a relay and/or a switch.

In accordance with one presently preferred embodiment, the means for transmitting signals to the control unit comprises at least one signal generator and at least one signal transmitting connection between the at least one signal generator and the control unit. The at least one connection is or can be prone to malfunction, i.e., the signal transmitting means assumes the inoperative condition in response to at least partial malfunctioning of the at least one connection. Such connection can include one or more buses and/or other types of electrical conductors.

Alternatively, or in addition to one or more connections which is or are prone to malfunction, the means for transmitting signals to the control unit can comprise at least one signal generator which is prone to malfunction, i.e., the signal transmitting means can assume an inoperative condition in response to at least partial malfunctioning of the at least one signal generator. Such signal generator can comprise a sensor or an electrical or electronic circuit.

The transmission of the power train is normally shiftable into and from any one of a plurality of different gears, and the signal transmitting means can comprise at least one sensor which serves to transmit to the control unit signals denoting the momentary gear of the transmission. Such at least one sensor and/or one or more additional sensors can further serve to transmit to the control unit signals denoting an intention by the operator of the motor vehicle to shift the transmission into or from a selected gear.

The arrangement can be such that the timing of disengagement of the torque transmission system by the control unit (by way of the actuator means) does not or need not coincide with the timing of starting the prime mover. The arrangement can be such that the disengagement of the torque transmission system by the control unit precedes the starting of the prime mover by the starting means.

The starting means for the prime mover can include a circuit which receives from the control unit suitable release signals to permit starting of the prime mover. The starting means for the prime mvoer can further comprise the aforementioned means (such as a relay and/or a switch) for actually starting the prime mover upon transmission of a release signal from the control unit to the circuit of the prime mover starting means. The cooperation between the control unit and the circuit of the prime mover starting means is or can be such that, in addition to the aforementioned release signals, the control unit can also transmit blocking signals which prevent starting of the prime mover. The means for actually starting the prime mover is or can be designed to perform its function upon transmission of a release signal while the at least one brake is being operated or actuated, and the means for actually starting the prime mover is ineffective when the circuit of the starting means receives from the control unit a blocking signal denoting that the at least one brake is inoperative (i.e., not applied).

The arrangement can be such that the control unit is caused to engage the torque transmission system by way of the actuator means when the operation (application) of the at least one brake is interrupted while the prime mover is still idle and the torque transmission system is partly engaged (e.g., that a friction clutch which is used as a torque transmission means operates with a certain amount of slip).

The control unit can comprise an electronic circuit and the actuator means can comprise at least one motor (e.g., an electric motor) and a fluid-operated or purely mechanical motion transmitting device between the at least one motor and the torque transmitting system.

Another feature of the invention resides in the provision of method of operating a power train in a motor vehicle which is provided with at least one brake and wherein the power train comprises a prime mover, means for operating the prime mover, a variable-speed transmission, an engageable and disengageable automated torque transmission system cooperating with at least one of the prime mover and the transmission, and means for operating the torque transmission system to select the magnitude of the torque being transmittable by such system. The system operating means is provided with a signal receiving, processing and transmitting control unit, an actuator which is arranged to operate the torque transmission system in response to signals from the control unit, and an arrangement which transmits signals to the control unit and has operative and inoperative conditions. The improved method comprises the steps of operating the control unit in a standard mode in the operative condition of the signal transmitting arrangement, and operating the control unit in an emergency or standby mode in the inoperative condition of the signal transmitting arrangement. This step of operating the control unit in the emergency mode includes disengaging the torque transmission system by way of the actuator when the operating means for the prime mover is actuated and the at least one brake is applied.

The signal transmitting means can comprise at least one signal generator and at least one device (such as a conductor, e.g., a bar) which normally transmits signals between the control unit and the at least one signal generator and is prone to malfunction to thus cause the signal transmitting arrangement to assume the aforementioned inoperative condition.

Alternatively, or in addition to the proneness of the signal transmitting device to become inoperative, the at least one signal generator can also be prone to malfunction to thus cause the signal transmitting arrangement to assume the inoperative condition.

The step of operating the control unit in the emergency or standby mode preferably includes disengaging the torque transmitting system and starting the prime mover at different times, i.e., such system disengaging and prime mover starting steps need not coincide. The arrangement is preferably such that the disengaging step takes place ahead of the prime mover starting step.

As already mentioned hereinbefore, the means for operating the prime mover can encompass or comprise a circuit which is arranged to permit and prevent starting of the prime mover, and means for actually starting the prime mover when the circuit permits such starting. The method of operating such a power train can further comprise the step of transmitting from the control unit to the circuit a release signal to permit starting of the prime mover at least during operation of the control unit in the emergency mode. Such method can further comprise the step of transmitting from the control unit to the circuit a stop signal denoting that the at least one brake is not applied to thus render the means for actually starting the prime mover ineffective when the circuit receives a blocking signal.

Still further, the method can comprise the step of engaging the torque transmission system when the application of the at least one brake is terminated while the prime mover is idle and while the torque transmission system is partly engaged.

The novel features which are considered as characteristic of the invention are set forth in particular in the appended claims. The improved power train itself, however, both as to its construction and the mode of assembling and operating the same, together with numerous additional important and advantageous features and attributes thereof, will be best understood upon perusal of the following detailed description of certain presently preferred specific embodiments with reference to the accompanying drawings.

DESCRIPTION OF PREFERRED EMBODIMENTS

Figure 1:
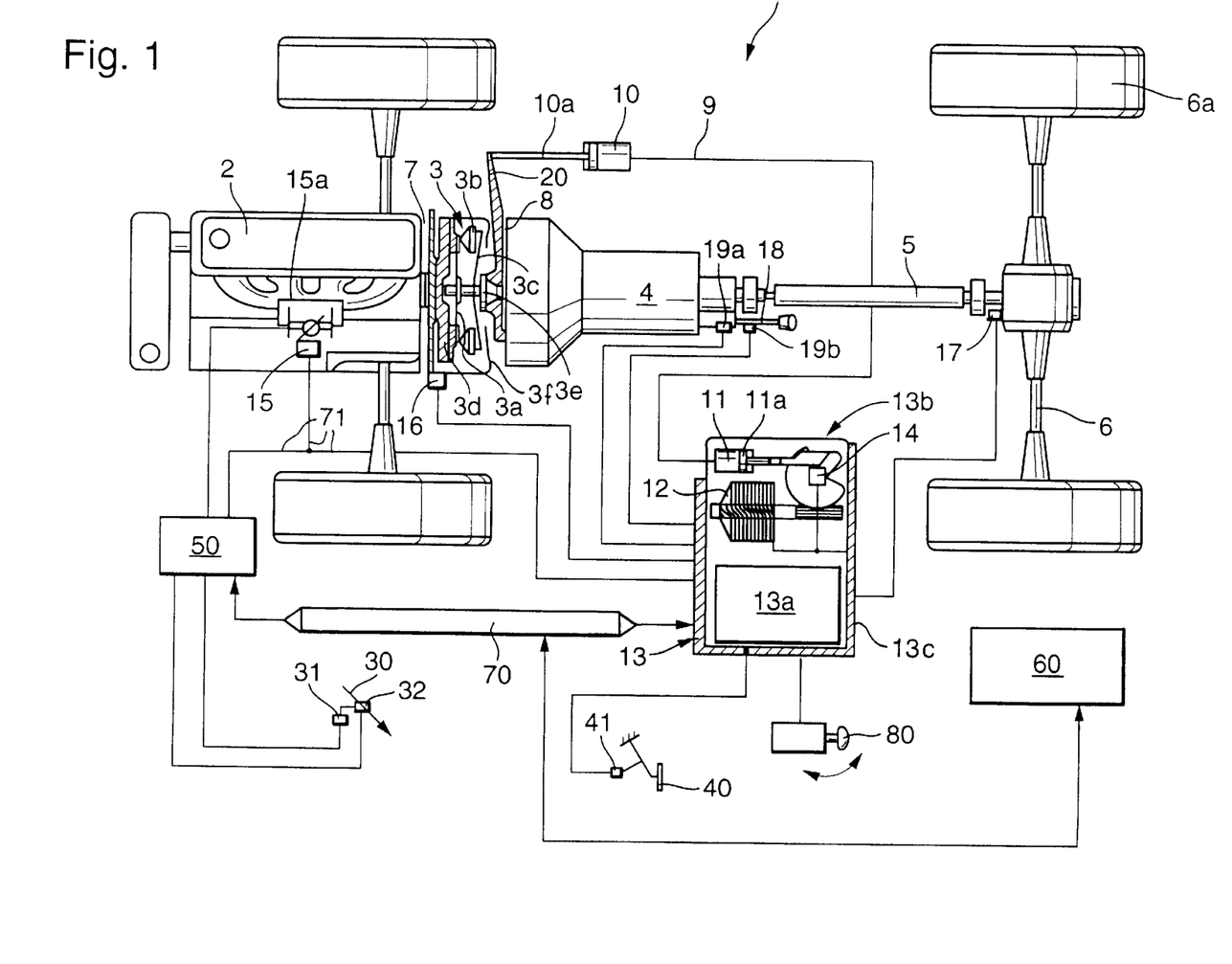
FIG. 1 is a schematic partially plan and partially sectional view of a motor vehicle including a power train which embodies one form of the invention.

FIG. 1 shows certain parts of a motor vehicle 1 wherein the power train comprises a prime mover 2 (such as a standard internal combustion engine or a motor), an automated torque transmission system 3 (shown in the form of a friction clutch) which can receive torque directly from an output element (such as a camshaft or a crankshaft) of the engine 2, and a manually shiftable change-speed transmission 4 having a rotary input element (e.g., a shaft) arranged to receive torque from a rotary output element (clutch disc or clutch plate) 3a of the clutch 3 and having a rotary output element 5 arranged to drive a differential for the axles 6 of driven wheels 6a.

The clutch 3 need not necessarily operate in the power flow between the prime mover (hereinafter called engine for short) 2 and the transmission 4; it is also possible to install the clutch downstream of the transmission. Furthermore, the clutch 3 need not be a friction clutch but can constitute any other suitable torque transmission system such as a dry friction clutch, a multiple-disc clutch, a magnetic powder clutch, or a lockup (also called bypass) clutch of the type normally employed in or with hydrokinetic torque converters. Reference may be had to commonly owned U.S. Pat. No. 5,377,796 granted Jan. 3, 1995 to Friedmann et al. for "APPARATUS FOR TRANSMITTING FORCE BETWEEN ROTARY DRIVING AND DRIVEN UNITS" which shows a hydrokinetic torque converter with a lockup clutch operating between a prime mover and a transmission. Still further, the clutch can be a self adjusting clutch of the type disclosed, for example, in commonly owned U.S. Pat. No. 5,409,091 granted Apr. 25, 1995 to Reik et al. for "AUTOMATICALLY ADJUSTABLE FRICTION CLUTCH" or in commonly owned U.S. Pat. No. 5,450,934 granted Sep. 19, 1995 to Maucher for "FRICTION CLUTCH".

It is further possible to replace the illustrated friction clutch 3 with a so-called starter clutch, a safety clutch or direction reversing clutch of the type disclosed, for example, in commonly owned U.S. Pat. No. 5,169,365 granted Dec. 8, 1992 to Friedmann for "POWER TRAIN", or in commonly owned U.S. Pat. No. 5,217,412 granted Jun. 8, 1993 to Indlekofer et al. for "CONTINUOUSLY VARIABLE SPEED TRANSMISSION". Moreover, the illustrated clutch 3 can be replaced with a clutch which is designed to transmit a desired torque with an extremely high degree of accuracy and reproducibility, with a so-called dry friction clutch, with a wet friction clutch at least certain components of which are immersed or confined in a body of liquid, or with a hydrokinetic torque converter (e.g., of the type disclosed in the aforementioned '796 patent to Friedmann et al.).

The illustrated manually shiftable variable-speed transmission 4 can be replaced with an automated transmission which is automatically shiftable into and from selected gears by one or more actuators. The automated transmission can be of the type which interrupts the power flow during automatic shifting (by one or more actuators) into a selected gear. Still further, the manual transmission 4 can be replaced with a fully automatic transmission which can be shifted into selected gears basically without an interruption of power flow. Such automatic transmissions normally employ suitable planetary gearings. Still further, the transmission can be an infinitely variable transmission with adjustable pulleys of the type disclosed, for example, in the aforementioned '365 patent to Friedmann or in the aforementioned '412 patent to Indlekofer et al. Each of the selected transmissions can be designed to shift into and from a plurality of gears, e.g., a neutral gear, a reverse gear and several forward gears.

The friction clutch 3 of FIG. 1 comprises an input side 7 which receives torque from the engine 2, and an output side 8 (including the aforementioned clutch disc or clutch plate 3*a*) which can transmit selected torque (including zero torque) to the input element of the transmission 4. The clutch disc 3*a* can be clamped between a flywheel or counterpressure plate 3*d* at the input side 7 and an axially movable pressure plate 3*b* when the clutch 3 is at least partially engaged. The pressure plate 3*b* is biased by a clutch spring 3*c* (such as a diaphragm spring) which rotates with a clutch housing 3*f* receiving torque from the flywheel 3*d* and further serving to non-rotatably but axially movably confine the pressure plate 3*b*.

The means for changing the condition (i.e., the extent of engagement or disengagement) of the automated friction clutch 3 comprises an axially movable bearing 3*e* which can engage the radially inwardly extending tongues or prongs of the diaphragm spring 3*c* to tilt the spring 3*c* relative to a seat in the housing 3*f*. Reference may be had to the aforementioned '091 patent to Reik et al. and/or to the aforementioned '934 patent to Maucher. The illustrated push-type clutch 3 can be replaced with a so-called pull-type clutch wherein the prongs or tongues of the clutch spring must be pulled in order to increase the extent of engagement of the clutch.

The means for operating the clutch 3, i.e., for selecting the magnitude of the torque which the flywheel 3*d* can transmit to the input element of the transmission 4 by way of the clutch disc 3*a*, comprises an electronic signal receiving, processing and transmitting control unit 13, an actuator 13*b* which responds to the signals from the control unit 13, and a hydromechanical connection 9, 10, 10*a*, 11, 11*a*, 20 between the actuator 13*b* and the bearing 3*e*. The electronic circuit of the control unit 13 is shown at 13*a*, and this circuit transmits signals to an electric motor 12 of the actuator 13*b*. The motor 12 can transmit motion to a spur, bevel, worm or crank gearing or a feed screw forming part of the actuator 13*b* and connected with the reciprocable input element (piston) 11*a* of a hydraulic or pneumatic (e.g., hydraulic) master cylinder 11 connected to a slave cylinder 10 by a hydraulic conduit 9 of the aforementioned connection 9, 10, 10*a*, 11, 11*a*, 20. The piston rod 10*a* of the slave cylinder 10 is operatively connected with a pivotable fork 20 which can change the axial position of the bearing 3*e* for the prongs of the clutch spring 3*c*. Additional motion transmitting means (e.g., a linkage or the like) can be provided between the illustrated gearing of the actuator 13*b* and the piston 11*a* of the master cylinder 11.

The common housing or casing 13*c* for the circuit 13*a* of the control unit 13 and the motor 12 of the actuator 13*b* can be replaced with two discrete housings or casings.

The circuit 13*a* can comprise the regulating and the power components for the electric motor 12 of the actuator 13*b*. An advantage of the illustrated combination of control unit 13 and actuator 13*b* in a common housing or casing 13*c* is that the space requirements of such parts of the means for operating the automated clutch 3 are reduced accordingly as well as that such parts can be assembled into a module at the manufacturing plant.

The means for transmitting signals to the input or inputs of the circuit 13*a* forming part of the control unit 13 comprises a plurality of sensors including a sensor 14 which monitors the positions, the orientation, the speed and/or the stressing of at least one mobile part of the actuator 13*b* to thus indicate the axial position of the bearing 3*e*, i.e., the extent of engagement of (the magnitude of the torque being transmitted by) the clutch 3. The sensor 14, or an additional or equivalent sensor (not shown), can be employed to directly monitor one or more parameters of the bearing 3*e* and/or of the fork 20 and/or of the piston rod 10*a* of the slave cylinder 10 to thus ascertain and signalize (to the circuit 13*a*) the interesting characteristics (such as the extent of engagement including full engagement and complete disengagement) of the clutch 3.

The electric motor 12 can be replaced by or utilized jointly with a fluid-operated (hydraulic or pneumatic) motor for the gearing of the actuator 13*b*. For example, the motor 12 can operate a hydraulic or pneumatic cylinder and piston assembly which, in turn, can operate the gearing of the actuator 13*b*. Still further, it is possible to utilize an actuator which employs one or more permanent magnets or electromagnets to establish a motion transmitting connection between the preferably electronic circuit 13*a* of the control unit 13 and the axially movable bearing 3*e* of the automated clutch 3. The bearing 3*e* cooperates with the clutch spring 3*c* to move the pressure plate 3*b* between two end positions (corresponding to the fully engaged and fully disengaged conditions of the clutch 3) and a preferably infinite number of intermediate positions (each corresponding to a different partly engaged condition of the clutch). The clutch disc 3*c* is provided with customary friction linings which are engageable (with or without slip) by the adjacent friction surfaces of the flywheel 3*d* and the pressure plate 3*b*. Reference may be had again to the aforementioned '091 patent to Reik et al. and/or to the aforementioned '934 patent to Maucher.

The arrangement is or can be such that, when the control unit 13 causes the bearing 3*e* to assume one or more intermediate positions, the magnitude of the momentarily applied engine torque (such torque is being applied by the flywheel 3*d*) is less than the magnitude of the torque which the clutch disc 3*a* transmits to the input element of the transmission 4. The control unit 13 and the associated actuator 13*b* are preferably designed to maintain the clutch 3 in a selected condition (for the transmission of a selected torque to the transmission 4) for desired (shorter or longer) intervals of time.

Still further, the clutch 3 can be designed or set up to transmit (when necessary) torques of a magnitude exceeding that which is then transmitted to the flywheel 3*d*. This is desirable when the clutch 3 is to serve as a means for absorbing any peaks of torque being transmitted by the engine 2, namely excessive torque which, if transmitted by the power train all the way to the wheels 6*a*, could affect the comfort of the occupant or occupants of the motor vehicle 1.

The sensor 14 is but one of several sensors which are normally provided to transmit signals to the circuit 13*a* of the control unit 13, either continuously or at selected (regular or irregular) intervals. Such signals are processed by the circuit 13*a*, and the processed signals enable the actuator 13*b* to accurately and reproducibly regulate the magnitude of the torque which the clutch 3 transmits between the engine 2 and the transmission 4. The additional sensors can be designed and set up to monitor all or the majority of relevant parameters of the constituents of the improved power train or the entire motor vehicle 1.

The signals from the sensor 14 and/or other sensors can be transmitted to the circuit 13*a* of the control unit 13 as well as to one or more additional electronic or other circuits in the motor vehicle 1. FIG. 1 shows an electronic engine circuit 50 and an electronic circuit 60 of a conventional anti-lock braking system (ABS) and/or a conventional antislip regulator (ASR). The circuits 50, 60 can receive signals from and preferably also transmit signals to the circuit 13*a* of the control unit 13. The means for transmitting signals between the circuit 13*a* on the one hand, and the circuits 50, 60 and several sensors (such as 14 to 17, 19*a*, 19*b*, 31, 32, 41) on the other hand, further comprises several conductors including one or more buses. One bus 70 (e.g., a CAN bus) is shown between the circuits 13*a* and 50.

A sensor 15 is provided to transmit (via electric conductor means 71) signals denoting or determining the angular position and/or other parameters of a pivotable flap forming part of a customary throttle valve 15*a* for the engine 2. This sensor 15 is connected with the circuits 13*a* and 50.

A further sensor 16 is designed to monitor the RPM of the rotary output element of the engine 2 (e.g., by monitoring the RPM of the flywheel 3*d*) and is connected to the circuit 13*a*.

Another sensor 17 is connected with the circuit 13*a* to transmit signals denoting the RPM of a rotary part of the differential which receives torque from the output element 5 of the transmission 4; this sensor 17 can serve to furnish signals denoting the RPM of the wheels 6*a* and hence the speed of the motor vehicle 1.

The circuit 13*a* processes some or all of the incoming signals and transmits appropriate signals to the motor 12 and (if and when necessary) to additional signal-responsive components of the motor vehicle 1.

The transmission 4 of FIG. 1 is a stepwise variable transmission which is provided with a gear shifting and selecting lever 18. Such lever is manipulated by the operator of the motor vehicl 1, and the transmission 4 can be shiftable, for example, into neutral gear, into reverse gear and into say three, four or five different forward gears. A sensor 19*b* is installed to transmit to the electronic circuit 13*a* signals which denote the actual positions of the lever 18 (i.e., the momentary gear of the transmission 4) and/or the presence or absence of an intention on the part of the driver or operator of the motor vehicle 1 to shift the transmission out of or into a particular gear. The sensor 19*b* can cooperate with or transmit signals independently of a further sensor 19*a*. For example, the sensor 19*a* can monitor the position (s), the speed, the acceleration and/or the magnitude of forces being applied to one or more internal parts of the transmission 4 for the purpose of generating signals which denote the momentary position of the lever 18 (i.e., the momentary gear of the transmission) and/or the presence or absence of an intent to shift the transmission into or from a particular gear. As already mentioned above, the sensors 19*a* and/or 19*b* can determine the existence or absence of an intent to shift the transmission 4 into or from a particular gear by monitoring the magnitude of the force being applied to to lever 18 and/or to one or more parts of the transmission 4 which are operatively connected with the lever 18.

Of course, at least one of the sensors 19*a*, 19*b* can be designed to monitor (in addition to or in lieu of monitoring the magnitude of forces) the position and/or the extent of displacement and/or other parameters of the lever 18 and/or other parts of the transmission 4 such as can be utilized to either directly ascertain or to calculate or estimate the presence or absence of an intent to shift the transmission 4 into or from a given gear. For example, the circuit 13*a* can monitor changes of the intensity and/or other parameters of signals from the sensor 19*a* and/or 19*b* as a function of time in order to ascertain the presence or absence of an intent to change the condition (gear) of the transmission 4.

As already mentioned hereinbefore, the circuit 13*a* can be continuously or temporarily connected with some or all of the aforementioned sensors and/or additional sensors and/or circuits (such as 50, 60) to process the signals in order to generate appropriate signals for transmission to the motor 12, i.e., for a selection of the extent of engagement or disengagement of the automated clutch 3, namely for selection of operation of the clutch 3 in dependency upon the actual operating point. A control program in the form of hardware and/or software is implemented in the circuit 13*a* to properly evaluate and process the incoming signals. Such evaluation or processing can involve a comparison of incoming signals with each other and/or with memorized information (e.g., characteristic fields, characteristic curves, functions and/or others).

It is presently preferred to design the circuit 13*a* in such a way that the latter embodies or cooperates with one or more of: a torque determining arrangement; a transmission gear selecting or detecting or determining arrangement; an arrangement which monitors and/or ascertains and/or determines the extent of slip between the aforementioned friction linings of the clutch disc 3*a* and the engine-driven parts 3*b*, 3*d* of the clutch 3; and/or an arrangement which monitors or determines the operating condition of the engine 2 and/or the motor vehicle 1. Such arrangements can be implemented as hardware or software in the form of control programs. All that counts is to ensure that the circuit 13*a* can cooperate with the various constituents of the means for transmitting signals to such circuit in order to adequately elect and regulate or control the RPM of the output element of the engine 2 (such RPM is monitored by the sensor 16), the gear of the transmission 4 (monitored by the sensor 19*a* and/or 19*b*), the extent of slip of (i.e., the magnitude of torque being transmitted by) the clutch 3 (determinable by comparing the signals from the sensors 15 and 17), and the momentary operating condition of the motor vehicle 1 (e.g., the speed determined by the sensor 17). As also mentioned hereinabove, at least one of the sensors 19*a*, 19*b* can directly or indirectly monitor the speed, the position and/or other parameters of one or more parts (such as a central shaft or rod) in the case of the transmission 4.

FIG. 1 further shows a load lever (such as a gas pedal) 30 which serves to select the rate of fuel admission into the cylinders of the engine 2. A first sensor 31 transmits to the engine circuit 50 signals which denote the position (such as the extent of depression) of the gas pedal 30, and a second sensor 32 transmits to the circuit 50 signals denoting whether or not the gas pedal 30 is being actuated. This enables the circuit 50 to transmit to the circuit 13*a* (via bus 70) signals denoting whether or not the engine 2 is idling. The sensor 32 can constitute a digital sensor, e.g., a simple switch which is normally off but is on when the gas pedal 30 is depressed.

Still further, FIG. 1 shows a brake actuating member 40 and a sensor 41 which monitors the position of the member 40 and transmits to the circuit 13*a* signals denoting that the vehicle brake and/or the parking brake (i.e., at least one brake) of the motor vehicle is or is not applied. The member 40 can constitute a standard brake pedal or a manually operated handgrip member which is pulled or pushed or otherwise moved to apply or to terminate the application of a parking brake.

The positions of the member 40 can be monitored by a single sensor 41 or by several sensors, e.g., a discrete sensor for each type of braking means provided in the motor vehicle 1. For example, the sensor 41 can constitute a simple digital sensor in the form of a switch which is on when at least one brake is being applied and is off when the vehicle is not braked.

The sensor 41 can include or cooperate with a standard brake light which is on as soon and as long as the brake including the member 40 is being applied. Such brake light can be provided regardless of whether the member 40 is part of a foot pedal-operated vehicle brake or of a parking brake. It is also possible to employ an analog sensor 41 (e.g., a potentiometer) which indicates that a brake is or is not applied as well as the extent of application of such brake. One or more brake lights can be provided and controlled by the sensor 41 regardless of the exact nature (digital or analog) of such sensor. The bus 70 can serve as a means for transmitting signals from the sensor 41 (via circuit 13*a*) to the engine circuit 50; however, it is also possible to provide a direct signal transmitting connection from the sensor 41 to the engine circuit 50.

The means for starting the engine 2 includes the circuit 50 and preferably also a suitable engine activating or starting component 80 which is connected with the control unit 13. For example, the part 80 can constitute an ignition key or an ignition switch which can be manipulated by the operator of the motor vehicle 1. It is presently preferred to employ a component 80 in the form of a key which can be turned and/or otherwise moved by the operator of the vehicle 1 to start or turn off the engine 2 provided that all conditions which warrant or render possible a starting of the vehicle are fully met.

The control unit 13 can be designed to regulate or control the motor 12 of the actuator 13*b* with an open-loop control range and with or without adaption. However, it is equally possible to employ a control unit with a closed-loop controlled system and feedback. Still further, it is possible to rely on a control or regulating procedure including a control stage with adaption and a regulating sage.

As a rule, the engine of a standard motor vehicle which comprises a power train embodying an automated transmission and/or an automated clutch, with the clutch installed between the engine and the transmission, can be started only when the transmission is, for example, in neutral gear; these are the circumstances under which the vehicle can be made ready for use by starting the engine. The unit which is utilized in such conventional motor vehicles to control the automated clutch can be caused to engage the clutch when the transmission is in any gear, i.e., in neutral or in any one of the reverse and forward gears. This ensures that the engagement of the clutch takes place automatically as soon as the engine is turned off, i.e., the clutch then acts as a parking brake which prevents a rolling of the vehicle when the engine is turned off because the drag torque of the engine suffices to hold the vehicle in a given position (against rolling) even if the vehicle is parked on an upwardly or downwardly sloping surface.

A drawback of such control units is that the power train is stressed as a result of the drag torque so that the shifting of the transmission out of a forward or reverse gear necessitates the exertion of a pronounced force by the operator of the vehicle, or such shifting is not possible at all.

The just described conventional motor vehicles can be equipped with sensors which serve to indicate the momentary setting of the transmission and/or the intention to shift the transmission into or from a particular gear. This enables the control unit to disengage the clutch in response to a signal denoting that the operator of the vehicle intends to shift the transmission into a different gear. Thus, if the operator shifts the transmission into neutral, the clutch can be disengaged and the operator employs the ignition key or an analogous part to activate or start the engine.

A drawback of such conventional proposals is that a malfunctioning of the means for transmitting signals to the control unit for the automated clutch can prevent the operator from actuating or starting the engine of the vehicle. Thus, if the engine can be activated or started (by a key or by other means) only while the transmission is in neutral and while the brake or brakes is or are not actuated, a defective sensor which serves to detect the presence or absence of an intention to shift the transmission, or a defective connection between such sensor and the control unit for the clutch, can prevent the operator from activating or starting the engine, i.e., from putting the motor vehicle to actual use. The reason is that the clutch cannot be disengaged and, if the power train is under stress as a result of the presence of drag torque, the operator is not capable of shifting the transmission into neutral which, in turn, prevents the activation or starting of the engine by an ignition key or the like.

Figure 2:
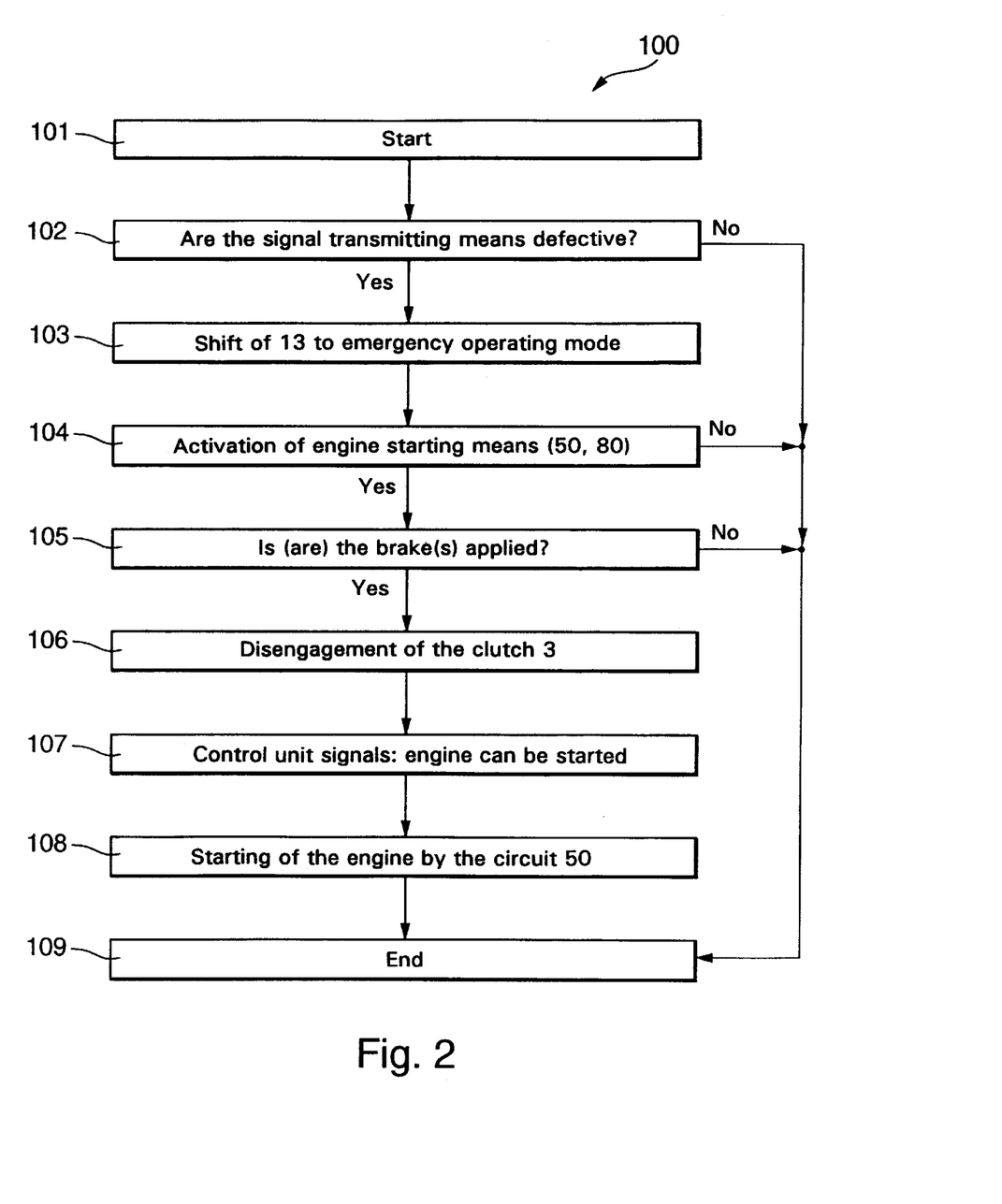
FIG. 2 is a diagram wherein the blocks denote various steps of one mode of operation of the improved power train.

FIG. 2 shows a diagram 100 wherein the blocks indicate certain modes of utilization of the means for operating the automated clutch 3 of FIG. 1. It will be seen that the operator of the motor vehicle 1 is in a position to start the engine 2 by way of the component 80 under circumstances which prevent such starting of the engine in heretofore known motor vehicles.

The block 101 denotes the start of a routine, and the block 102 denotes a determination by the control unit 13 whether or not one or more constituents of the means (14–17, 19*a*, 19*b*, 31, 32, 41, 50, 60, 70, 71, etc.) for transmitting signals to the circuit 13*a* are defective, either entirely or in part or temporarily. The signal from the sensor 14 can also serve to indicate whether or not the actuator 13*b* and/or its connection (9, 10, 10*a*, 11, 11*a*, 20) to the bearing 3*e* is defective, either entirely or in part or temporarily. For example, one of the connections between the circuit 13*a* and/or circuits 50, 60 and/or sensors 14–17, 19*a*, 19*b*, 31, 32, 41 can be defective, and this can be detected by the circuit 13*a* due to the absence of continuous or intermittent signals from the respective circuit(s) and/or sensor(s).

If the step which is denoted by the block 102 results in the generation of a signal denoting that at least one of the circuits 50, 60, of the sensors and/or of the signal transmitting connections (such as 70, 71) is defective, the method involves a series of steps including that denoted by the block 103. If the answer to the step of monitoring for the presence of defects is in the negative, the procedure is terminated at 109.

The block 103 is indicative of the start of the operation of the control unit 13 in accordance with an emergency or standby mode (in contrast to the standard or normal mode which is effective if none of the component parts of the means for transmitting signals to the circuit 13*a* are defective). The standby or emergency mode involves, for example, the utilization of different sensor signals or a different utilization of sensor signals for the operation of the automated clutch 3. The reason is that, due to the malfunctioning of one or more sensors, conductors and/or circuits which normally transmit signals to the circuit 13a, certain signals are not available or are not available when required or are not available in their entirety.

For example, if the sensor 19a and/or 19b or a connection from at least one of these sensors to the circuit 13a is defective or entirely out of commission, the circuit 13a cannot receive signals which normally denote the then effective gear of the transmission 4 and/or the presence or absence of an intent to shift the transmission 4 into or from a particular gear.

It is preferred to equip the motor vehicle 1 with one or more means for generating optical, acoustic and/or other suitable signals which inform the operator of the vehicle that the operation of the control unit 13 has been shifted from the standard mode to the emergency mode. For example, such signal can be furnished by a lamp and/or by a bell whose signal is observable and/or otherwise discernible on the instrument board in front of the driver's seat in the motor vehicle.

The block 104 in the diagram 100 of FIG. 2 denotes the determination (by the circuit 13a) whether or not the component 80 is being actuated and/or whether or not the circuit 50 indicates an actuation of the component 80. If the answer is in the negative, the routine is terminated (note the block 109). If the answer is in the affirmative, the next step (note the block 105) involves a determination whether or not the brake including the member 40 or at least one of the brakes is being applied. If the brake or brakes is/are not applied (operated), the routine is terminated at 109. If the brake or brakes has or have been applied, the next step (block 106) involves an automatic disengagement of the clutch 3 via actuator 13b and the hydraulic motion transmitting connection 9–11a to the fork 20. Such disengagement of the clutch 3 takes place if at least one brake is applied and the operator seeks to start the engine 2 by way of the component (such as an ignition key) 80. The block 107 denotes the step of transmitting a signal from the circuit 13a to the engine circuit 50 that the engine 2 can be started. If the circuit 50 receives such a signal from the circuit 13a, actuation of the component 80 entails an actual starting of the engine (block 108 in the diagram 100 of FIG. 2). The routine is terminated at 109 when the step of starting the engine 2 (at 108) is completed because the engine is running.

The disengagement of the clutch 3 and the starting of the engine 2 (while the control unit 13 operates in the emergency mode) need not take place simultaneously. The interval between such steps (starting of the engine follows the disengagement of the clutch) should at least suffice to ensure that the clutch 3 is disengaged before the engine 2 is actually started.

If the application of the brake or brakes (at 40) is terminated while the clutch 3 is at least partially engaged (block 106 in the diagram 100 of FIG. 2), the clutch 3 can be reengaged and the starting of the engine 2 is preferably interdicted. However, it is also possible to start the engine 2 while the clutch 3 is disengaged, provided that the application of the brake(s) is terminated following an initial application.

In normal operation (standard operating mode of the control unit 13), the engine 2 can be started by way of the component 80, circuit 13a, bar 70 and circuit 50 without the need to apply the brake or brakes. However, and as already explained hereinbefore with reference to the block diagram 100 of FIG. 2, the operation of the control unit 13 is shifted into the emergency or standby mode when the condition of the means for transmitting signals to the circuit 13a changes from operative to inoperative. This ensures that, in the emergency mode, the engine 2 can be started only when the brake or brakes is or are applied. At such time, the clutch 3 is disengaged.

The engine 2 can be activated or started while the clutch 3 is only partly disengaged, provided that the torque which the partly engaged clutch can transmit is below a predetermined value, namely a torque less than that torque which is required to set the motor vehicle 1 in motion.

The aforementioned German patent application No. 195 04 847 corresponds to U.S. Pat. No. 5,679,091 granted Oct. 21, 1997 to Michael Salecker, Uwe Wagner, Michael Reuschel, Martin Rauser, Bruno Miller and Alfons Wagner, for Method of and Apparatus for Regulating the Transmission of Torque in Power Trains.

The aforementioned German patent application Serial No. 195 48 799 corresponds to the commonly owned U.S. patent application Ser. No. 08/708,096 filed on Aug. 26, 1996 by Michael Salecker et al. and now U.S. Pat. No. 5,875,679 for "METHOD OF AND APPARATUS FOR CONTROLLING A TORQUE TRANSMISSION SYSTEM BETWEEN A DRIVIG UNIT AND A DRIVEN UNIT".

The disclosures of all of the above-mentioned U.S. patents, as well as of all of the above-mentioned patent applications, be it U.S. patent applications or foreign patent applications, as well as of all patents to be granted on such applications, if and when granted, are incorporated in the disclosure of the present application by reference.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art of power trains for motor vehicles and, therefore, such adaptations should and are intended to be comprehended within the meaning and range of equivalence of the appended claims.

What is claimed is:

1. For use in a motor vehicle, a power train comprising a prime mover; starting means actuatable to start said prime mover; a variable-speed transmission; an engageable and disengageable automated torque transmission system; at least one brake operable to oppose a movement of the vehicle; and means for operating said system to select the magnitude of torque being transmissible by said system, said operating means comprising a signal receiving, processing and transmitting control unit, means for transmitting signals to said control unit, said signal transmitting means having operative and inoperative conditions, and actuator means arranged to operate said system in response to signals from said control unit, said control unit being effective to operate in a standard mode in the operative condition and in an emergency mode in the inoperative condition of said signal transmitting means, said control unit being operative to disengage said system by way of said actuator means when said starting means is actuated simultaneously with the operation of said at least one brake while said control unit operates in said emergency mode.

2. The power train of claim 1, wherein said means for transmitting signals to said control unit includes at least one of (a) at least one sensor, (b) at least one conductor, and (c) at least one circuit.

3. The power train of claim 1, wherein said torque transmission system comprises a clutch.

4. The power train of claim 3, wherein said clutch is arranged to receive torque from said prime mover and to transmit torque to said transmission.

5. The power train of claim 1, wherein said starting means comprises at least one of (A) a circuit and (B) a component operable by said control unit.

6. The power train of claim 5, wherein said component comprises at least one of (i) a relay and (ii) a switch.

7. The power train of claim 1, wherein said means for transmitting signals comprises at least one signal generator and at least one signal transmitting connection between said at least one signal generator and said control unit, said at least one connection being prone to malfunction and said signal transmitting means assuming said inoperative condition in response to at least partial malfunctioning of said at least one connection.

8. The power train of claim 7, wherein said at least one signal transmitting connection comprises a bus.

9. The power train of claim 1, wherein said means for transmitting signals comprises at least one signal generator which is prone to malfunction and said signal transmitting means assuming said inoperative condition in response to at least partial malfunctioning of said at least one signal generator.

10. The power train of claim 9, wherein said at least one signal generator comprises a sensor.

11. The power train of claim 9, wherein said at least one signal generator includes a circuit.

12. The power train of claim 1, wherein said transmission is shiftable into and from any one of a plurality of different gears and said signal transmitting means comprises at least one sensor arranged to transmit signals denoting the momentary gear of said transmission.

13. The power train of claim 1, wherein said transmission is shiftable into and from any one of a plurality of different gears by an operator of the motor vehicle and said signal transmitting means includes at least one sensor arranged to transmit signals denoting an intention by the operator to shift the transmission into or from a selected gear.

14. The power train of claim 1, wherein said control unit is operative to disengage said system and said starting means is arranged to start said prime mover at timely spaced intervals.

15. The power train of claim 14, wherein the disengagement of said system by said control unit precedes the starting of said prime mover by said starting means.

16. The power train of claim 1, wherein said starting means comprises a circuit arranged to receive from said control unit release signals to permit starting of said prime mover.

17. The power train of claim 16, wherein said starting means further comprises means for actually starting said prime mover upon transmission of a release signal to said circuit.

18. The power train of claim 1, wherein said starting means comprises a circuit arranged to receive from said control unit release and blocking signals to respectively permit and prevent starting of said prime mover, said starting means further comprising means for actually starting said prime mover upon transmission of a release signal while said at least one brake is being operated and said means for actually starting being ineffective when said circuit receives a blocking signal denoting that said at least one brake is inoperative.

19. The power train of claim 1, wherein said control unit is arranged to engage said system by way of said actuator means when the operation of said at least one brake is interrupted while said prime mover is still idle and said system is partly engaged.

20. The power train of claim 1, wherein said control unit comprises an electronic circuit and said actuator means comprises a motor and a fluid-operated motion transmitting device between said motor and said system.

21. A method of operating a power train in a motor vehicle which is provided with at least one brake and wherein the power train comprises a prime mover, means for operating the prime mover, a variable-speed transmission, an engageable and disengageable automated torque transmission system cooperating with at least one of the prime mover and the transmission, and means for operating the torque transmission system to select the magnitude of the torque being transmittable by the system, the system operating means being provided with a signal receiving, processing and transmitting control unit, an actuator arranged to operate the torque transmission system in response to signals from the control unit, and an arrangement which transmits signals to the control unit and has operative and inoperative conditions, comprising the steps of:

operating the control unit in a standard mode in the operative condition of the signal transmitting arrangement; and operating the control unit in an emergency mode in the inoperative condition of the signal transmitting arrangement, including disengaging the torque transmission system by way of the actuator when the operating means for the prime mover is actuated and the at least one brake is applied.

22. The method of claim 21 of operating a power train wherein the signal transmitting means comprises at least one signal generator and at least one device which normally transmits signals between the control unit and the at least one signal generator and is prone to malfunction to thus cause the signal transmitting arrangement to assume said inoperative condition.

23. The method of claim 21 of operating a power train wherein the signal transmitting means comprises at least one signal generator and at least one device which normally transmits signals between the control unit and the at least one signal generator, the at least one signal generator being prone to malfunction to thus cause the signal transmitting arrangement to assume said inoperative condition.

24. The method of claim 21, wherein said step of operating the control unit in the emergency mode includes disengaging the torque transmission system and starting the prime mover at different times.

25. The method of claim 24, wherein said disengaging step takes place ahead of said starting step.

26. The method of claim 21 of operating a power train wherein the means for operating the prime mover encompasses a circuit arranged to permit and prevent starting of the prime mover and means for actually starting the prime mover when the circuit permits such starting, further comprising the step of transmitting from the control unit to the circuit a release signal to permit starting of the prime mover at least during operation of the control unit in said emergency mode.

27. The method of claim 26, further comprising the step of transmitting from the control unit to the circuit a stop signal denoting that the at least one brake is not applied to thus render the means for actually starting the prime mover ineffective when the circuit receives a blocking signal.

28. The method of claim 21, further comprising the step of engaging the torque transmission system when the application of the at least one brake is terminated while the prime mover is idle and while the torque transmission system is partly engaged.

* * * * *